United States Patent Office 2,697,025
Patented Dec. 14, 1954

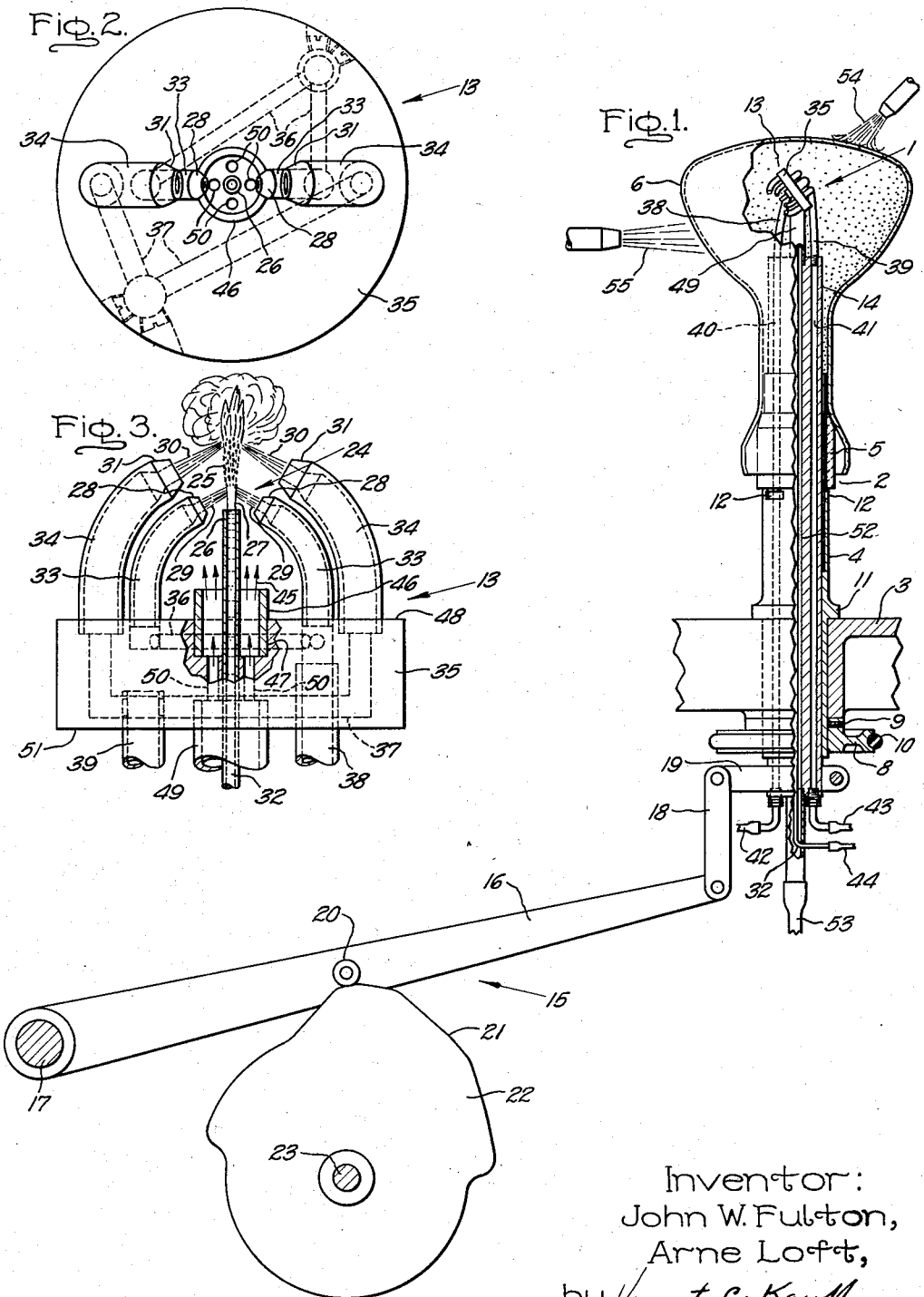
Dec. 14, 1954   J. W. FULTON ET AL   2,697,025
METHOD AND APPARATUS FOR COATING HOLLOW GLASSWARE
Filed Dec. 12, 1950
Inventor:
John W. Fulton,
Arne Loft,
by Vernet C. Kauffman
His Attorney.

2,697,025

METHOD AND APPARATUS FOR COATING HOLLOW GLASSWARE

John W. Fulton, Chardon, Ohio, and Arne Loft, Schenectady, N. Y., assignors to General Electric Company, a corporation of New York Application December 12, 1950, Serial No. 200,429

7 Claims. (Cl. 23—182)

Our invention relates to method and apparatus for internally coating hollow glass articles, such as electric lamp envelopes, with a layer of minute light-diffusing particles. More particularly, our invention relates to a burner arrangement for generating a controlled fume or smoke of light-diffusing particles which can be utilized to produce the desired deposition or distribution of such particles over the inner surface of hollow glassware.

It is well known to produce a light-diffusing coating on the interior wall of a lamp bulb or other hollow glass article by deposition from a fume or cloud of minute light-diffusing particles generated within the hollow interior of the article by burning one or more cloud-producing substances in a burner situated within the article. Such a process is disclosed, for instance, in co-pending U. S. application Serial No. 878, M. Pipkin, filed January 7, 1948, now Patent No. 2,626,874, and assigned to the assignee of the present invention. The substance preferably employed as the combustible cloud-producing material in such coating process comprises an organic silicon compound such as ethyl silicate which is burned within the article in the presence of air or oxygen to produce a fume or cloud of very fine silica particles. The silica coating thus produced possesses excellent light-diffusing characteristics.

With the usual burner arrangements heretofore employed in the above-described coating process, the ethyl silicate or other cloud-producing material, which normally is in a liquid state, is thermally vaporized by flowing it onto hot parts of the burner. The vaporized material is then burned at the very mouth or discharge opening of the burner with the result that a hot ash, formed by the burning reaction, deposits and rapidly collects on the parts of the burner which are closely adjacent to and cooler than the flame, thereby forming a hard and very adherent crust on the burner which interferes with the uniform operation thereof. As a result, it has been the customary practice to periodically remove this ash deposit or crust from the burner parts. However, because this crust is very difficult to remove, such a cleaning operation is rather difficult and inconvenient to perform, and therefore constitutes a deterrent to the utility of any automatic equipment which may be employed for such coating process.

It is an object, therefore, of our invention to provide an improved method and apparatus for generating a cloud or fume of minute light-diffusing silica particles by combustion of a silicon compound whereby the formation of a crust deposit on the burner parts is substantially eliminated and uniformity of operation of the burner thereby assured at all times.

Another object of our invention is to provide an improved method and apparatus for generating a cloud of minute light-diffusing silica particles by combustion of a silicon compound discharged from a burner head whereby the latter is kept clean at all times of deposited silica particles settling out of the cloud thereof formed by the burning of the silicon compound.

In accordance with the invention, the combustible cloud-producing silicon compound is finely atomized by a spray nozzle in the burner head to produce a flat-shaped spray which is ignited and burned in free space at a region removed from the burner head, thus spacing from the flame the parts of the burner which are cooler than the flame and thereby substantially eliminating the formation and deposition of a hard ash or crust on the burner such as would otherwise interfere with the uniform operation of the burner. Preferably, in addition, a cleaning jet of air or other substantially inert gaseous medium is directed along the discharge end of the burner spray head or nozzle so as to substantially surround the same and be introduced between the spray of the cloud-producing silicon compound and the stream of oxygen or other combustion-supporting gas emanating from the burner, for the purpose not only of cooling the spray nozzle to prevent premature vaporization of the ethyl silicate or other cloud-producing material therein, but also for the further more important purpose of keeping the burner nozzles clean of the substantially non-adherent layer of fine, soft silica particles which tends to form on the burner by the settling of such particles out of the cloud thereof formed by the burning of the silicon compound.

Further objects and advantages of our invention will appear from the following detailed description of a species thereof and from the accompanying drawing.

In the drawing, Fig. 1 is an elevation, partly in section, of coating apparatus according to the invention for generating a fume or cloud of minute light-diffusing particles and depositing a coating of such particles on the interior wall of a lamp bulb, and Figs. 2 and 3 are plan and side views, respectively, of the burner head of the apparatus shown in Fig. 1, the side view in Fig. 3 being partly broken away and shown in section.

Referring to the drawing, the coating apparatus according to the invention comprises a burner unit 1 vertically reciprocable within a vertically extending sleeve-like article or bulb holder 2 which is rotatably mounted in a stationary support bracket 3 for rotation about the vertically extending axis of the holder. The said holder 2 comprises a sleeve portion 4 which is provided with an external collar 5 adjacent its upper end on which the glass bulb or other article 6 to be coated is adapted to rest so as to support the bulb or other article in place in an upright position, as shown in Fig. 1. The collar 5 may be made of a suitable metal such as brass, or of a refractory material (such as a mixture of asbestos and Portland cement for instance) so as to be less likely to crack the glass bulb 6 during the heating thereof incident to the coating operation. The upper end of the bulb holder sleeve 4 fits more or less closely within the neck of the bulb 6 to thereby assist in holding the bulb in upright position in alignment with the holder sleeve 4 during the rotative movement of the bulb holder. Rotation of the bulb holder 2 is imparted thereto by means of a pulley 8 which is suitably fastened or keyed onto the lower end of the holder sleeve 4 beneath the bracket 3, as by means of a set screw 9 for instance. The pulley 8 is driven from a source (not shown) of constant rotation by means of a belt 10. The bulb holder 2 is restrained from vertical movement along with the burner 1 by the engagement of the pulley 8 with the underside of the bracket 3 and the engagement of a support flange 11 on the holder sleeve 4 with the upper side of the bracket. The holder sleeve 4 is provided with a number of outlet openings or side ports 12 located around its circumference beneath the bulb-supporting collar 5 to provide vents for the passage to the outside atmosphere of the excess silica smoke and products of combustion formed within the bulb 6 during the coating process.

The burner 1 comprises a head portion 13 supported from and above the upper end of a support tube portion 14 which extends down through and is vertically slidable within the holder sleeve 4. The burner 1 is supported in position against rotative movement and vertically reciprocated by means of a cam-actuated elevating and lowering mechanism 15 comprising a lever arm 16 pivotally supported at one end on a shaft 17 and connected at its other end, by a link 18, to a collar 19 fastened to the lower end of the burner support tube 14. The lever arm 16 carries a cam follower roller 20 which rests and rides on the edge or periphery 21 of a rotating plate cam 22 fastened on a drive or cam shaft 23. The periphery or cam surface 21 of the cam 22 is suitably shaped to impart the desired vertical movement to the burner 1 for controlling the distribution of the coating material which is applied to the bulb 6 by the burner.

In accordance with the invention, the burner head 13 is composed in part of a spray nozzle portion 24 adapted to atomize the liquid ethyl silicate or other silicon compound and form it into a fine spray, as indicated at 25 in Fig. 3. The spray nozzle portion 24 of the burner head 13 comprises a central nozzle 26 of relatively small diameter for discharging a liquid fuel jet 27 of ethyl silicate or other suitable organic silicon compound, and a pair of opposed atomizing nozzles 28, 28 disposed on diametrically opposite sides of and in a common vertical plane with the central nozzle for directing opposed jets 29, 29 of oxygen or other suitable combustion-supporting gas against opposite sides of the liquid silicon fuel jet 27 to thereby minutely atomize the latter into a flat fan-shaped spray 25 which is then ignited and burned in free space, at a point removed from the nozzles 26 and 28, by ignition means preferably in the form of gas fires 30, 30 from a pair of opposed gas burner nozzles 31, 31. The nozzles 26, 28 and 31 are located at the ends of corresponding nozzle tubes or pipes 32, 33 and 34, respectively, which are mounted and supported in place in a burner head support block 35. The two oxygen nozzle tubes 33, 33 are interconnected within the block 35 by a passageway 36 therein, while the two gas fire nozzle tubes 34, 34 are likewise interconnected within the said block by a passageway 37. The passageways 36 and 37 in the block 35 are connected by pipes 38 and 39, respectively, to longitudinally extending passageways 40 and 41 in the burner support tube 14 which latter passageways are in turn respectively connected at their lower ends, by pipes 42 and 43, to a supply of oxygen or other combustion-supporting gas and to a supply of oxygen-gas or other combustible gaseous admixture. The center nozzle tube 32 is supported in place within the support block 35 and it extends therethrough and down through the burner support tube 14 where it is connected at its lower end by a pipe 44 to a liquid supply of ethyl silicate or other suitable organic silicon compound under a suitable pressure such as, for example, 10 lbs. per square inch. The pipes 38 and 39 partly support the burner head 13 in place on the burner support tube 14.

In the operation of a burner arrangement such as described above, the atomized spray 27 of liquid ethyl silicate or other silicon-containing fuel from the center nozzle 26 is ignited by the ignition means or gas fires 30, 30 at a point removed from the discharge end of the silicon fuel nozzle 26. The silicon-containing fuel is thus burned in free space away from the cooler parts of the burner, as a result of which the deposition of hot ash on such cooler burner parts, and therefore the formation of a hard crust deposit on the discharge end of the burner nozzles 26, 28, is completely eliminated.

With the burner arrangement according to the invention wherein the liquid silicon-containing fuel is vaporized by atomization from a spray nozzle, as well as with the prior arrangements heretofore in use wherein the silicon-containing fuel is thermally vaporized by flowing it onto hot parts of the burner, the ensuing combustion or burning of the silicon-containing fuel produces a cloud or fume of extremely minute lightweight soft silica particles (distinct from the hard crust of silica ash formed on the burner parts by the prior thermal fuel-vaporization processes heretofore in use) which settle out onto the burner parts and form a non-adherent layer thereon which tends to clog the burner openings. In accordance with the invention, the deposition of such a non-adherent layer of soft silica particles on the ends of the liquid fuel nozzle 26 and the oxygen jet nozzles 28 and resultant clogging of the openings thereof, and preferably, in addition, premature vaporization of the liquid silicon-containing fuel in the nozzle 26 and supply tube 32, is effectively eliminated by the incorporation in the burner head 13 of a very low velocity cleaning and preferably cooling jet 45 of a substantially inert gas, such as air or nitrogen for instance, which is continuously operated during the operation of the burner. As indicated by the arrows in Fig. 3, the said low velocity cleaning jet 45 is directed outwardly along the center liquid fuel nozzle 26 so as to form, in effect, a sheath of such inert gas around the nozzle 26 which not only serves to cool the said nozzle and thus prevent vaporization of the liquid silicon-containing fuel therein, but which also passes between the center nozzle 26 and the two side oxygen jet nozzles 28 so as to be directed between the individual jets therefrom and impinge against the ends of the nozzles 26 and 28, thereby blowing off of such nozzle ends, and so preventing clogging of the nozzle openings by, the soft silica particles which tend to settle thereon out of the cloud of silica smoke produced during the operation of the burner. Obviously, the cleaning jet 45 must be at a sufficiently low velocity so as not to materially interfere with or disrupt the directional character and atomizing effect of the oxygen vaporization jets 29 on the liquid fuel jet 27 from the center nozzle 26. Thus, for the purposes of the invention, we have found the use of a pressure of around 1 to 2 pounds per square inch or so to be entirely adequate for the cleaning jet 45.

As shown in Fig. 3, the cleaning jet 45 is discharged from a short tube 46 which concentrically surrounds the center nozzle pipe 32 and is fitted within a recess 47 in the front side 48 of the burner head support block 35 so as to project a short distance outwardly therefrom, as shown. The tube 46 communicates with a connecting supply pipe 49 through a series of passageways or apertures 50 which are provided in the support block 35. The connecting supply pipe 49 is fastened at one end to the back side 51 of the support block 35, and its other end is fastened to the upper end of the burner support tube 14 in communication with a central bore or passageway 52 therein which is connected at its lower end, by means of a pipe 53, to a supply of air or other substantially inert gas such as nitrogen, at a suitable relatively low pressure of from 1 to 2 pounds per square inch or thereabouts.

In the operation of the burner according to the invention for coating a number of bulbs or other articles 6 in succession, the gas ignition fires 30, 30 and the cleaning jet 45 (after the former have been preliminarily adjusted to operate properly with the oxygen vaporization jets 29 and the cleaning jet 45 turned on) are both started in operation and allowed to operate continuously thereafter. The bulb 6 or other article to be coated is then placed over the burner head in position on the holder 2, as shown in Fig. 1, after which the oxygen vaporization jets 29 and the liquid fuel jet 27 are turned on. The resulting finely atomized spray of the liquid ethyl silicate or other silicon-containing fuel is ignited by the continuously burning gas fires 30, thus producing a dense fume or cloud of minute light-diffusing particles of silica within the bulb which then deposit on and coat the inner wall of the bulb to form a thin and extremely efficient light-diffusing coating thereon. The excess silica particles and products of combustion formed within the bulb by the burning reaction pass out through the space between the holder sleeve 4 and the burner support tube 14, and thence out through the ports or side openings 12 of the said tube 14 to the outside atmosphere.

During the operation of the burner, the bulb 6 or other article may be rotated by the rotation of the holder 2 and, in addition, the burner unit 1 is preferably moved up and down in the bulb by the cam-actuated lever 16 in order to obtain a highly uniform distribution of the silica coating on the bulb wall. Also, in certain applications, such as where it is desired to produce a coating differing in density or thickness over certain areas of the bulb wall, certain additional steps may be taken to obtain the desired result. Thus, in the particular case illustrated where a heavy coating is to be applied to the side wall, and a light coating is to be applied to the top or bowl end of a glass lamp bulb commercially known as an R-40 type bulb, the burner head 13, in addition to being moved up and down in the bulb and the latter also rotated during the operation of the burner, is mounted on the support tube 14 in a tilted position inclined downwardly at an angle of around 45° or so relative to the said support tube 14, as shown in Fig. 1, in order to direct the main stream of the fume or cloud of silica particles from the burner onto the side wall of the bulb so that only the spill from the silica fume deposits on the top or bowl end of the bulb to form a light coating thereon. If desired, to further aid in obtaining such a differential coating on the bulb 6, the top or bowl end thereof may be extremely heated prior to and during the operation of the burner 1, as by means of a gas fire 54 directed thereagainst, and the side wall at the same time externally cooled as by means of a high-pressure external air cooling jet 55 directed thereagainst, as shown in Fig. 1. The heating of the top of the bulb in this manner acts to decrease, and the cooling of the side wall acts to increase, the amount of silica deposited on such areas of the bulb.

After the deposition of the desired coating on the bulb wall, the liquid fuel jet 27 and the oxygen vaporizing jets 29 are turned off, the flame allowed to extinguish, and the bulb then lifted off the holder 2 and the burner head 13, whereupon the next bulb to be coated is then placed in position on the holder 2 in readiness for the coating thereof.

With the burner arrangement according to the invention, not only is the formation of a hard ash deposit or silica crust on the burner nozzles completely avoided, but clogging of the nozzle openings by the soft silica which settles out of the fume formed during the burner operation is also eliminated as well. As a result, uniformity in the operation of the burner at all times, and therefore uniformly alike coatings on successive bulbs, is thereby assured. Moreover, the thin layer of silica which settles onto the burner parts other than the ends of the nozzles 26 and 28 (which latter are maintained clean of such silica layer by the cleaning jet 45) is soft and very easy to brush off. The result, therefore, is a burner which is easy to maintain in proper operating condition and which will not require frequent periods of shut-down, so that it lends itself admirably to use in automatic coating machinery for the high production processing of lamp bulbs and the like.

Although a preferred embodiment of our invention has been disclosed, it will be understood that the invention is not to be limited to the specific construction and arrangement of parts shown, but that they may be widely modified within the spirit and scope of our invention as defined by the appended claims.

What we claim as new and desire to secure by Letters Patent of the United States is:

1. The method of producing a fume of minute light-diffusing silica particles by burning a fuel mixture of an organic silicon compound and oxygen which comprises, forming a liquid fuel jet of the said organic silicon compound, atomizing into a fine spray and oxygenating the said liquid fuel jet by directing a jet of oxygen against said liquid jet, and igniting and burning said atomized oxygenated spray of organic silicon compound in free space at a point removed from the region of initial atomization of said liquid fuel jet.

2. The method of producing a fume of minute light-diffusing silica particles by burning a fuel mixture of an organic silicon compound and oxygen which comprises, forming a liquid fuel jet of the said organic silicon compound, atomizing into a fine spray and simultaneously oxygenating the said liquid fuel jet by directing opposed jets of oxygen against opposite sides of said liquid fuel jet, and igniting and burning said atomized oxygenated spray of organic silicon compound in free space at a point removed from the region of initial atomization of said liquid fuel jet.

3. The method of producing a fume of minute light-diffusing particles by burning a fuel mixture of ethyl silicate and oxygen which comprises, forming a liquid fuel jet of the said ethyl silicate, atomizing into a fine spray and oxygenating the said liquid fuel jet of ethyl silicate by directing a jet of oxygen against said liquid fuel jet, and igniting and burning said atomized oxygenated spray of ethyl silicate in free space at a point removed from the region of initial atomization of said liquid fuel jet.

4. Apparatus for generating a fume of minute light-diffusing particles comprising a burner including support means, spray generating means comprising a fuel nozzle mounted on said support means and having an orifice connected to a liquid fuel source of an organic silicon compound to discharge a liquid jet of the said fuel and an atomizing nozzle mounted on said support means and having an orifice connected to a source of a combustion-supporting gas to discharge a jet of said gas from the orifice, said atomizing nozzle being spaced to one side of and directed slantingly across the orifice of said fuel nozzle to intersect the axis thereof at a region beyond the end of said fuel nozzle so as to direct the gas jet from said atomizing nozzle against the said liquid fuel jet only at a region outwardly beyond the end of said fuel nozzle to atomize the fuel jet into a fine spray, and a gas fire burner mounted on said support means adjacent said spray generating means and having a burner opening facing in a direction extending across the fuel nozzle orifice and intersecting the said spray of atomized fuel at a point outwardly beyond the said region of atomization of said liquid fuel jet to direct gas fires against and ignite the said fuel spray at the said intersection point.

5. Apparatus for generating a fume of minute light-diffusing particles comprising a burner including support means, spray generating means comprising a fuel nozzle mounted on said support means and having an orifice connected to a liquid fuel source of an organic silicon compound to discharge a liquid jet of the said fuel and an atomizing nozzle mounted on said support means and having an orifice connected to a source of a combustion-supporting gas to discharge a jet of said gas from the orifice, said atomizing nozzle being spaced to one side of the fuel nozzle and angularly directed across the orifice of said fuel nozzle in a direction away therefrom to intersect the axis thereof at a region beyond the end of said fuel nozzle so as to direct the gas jet from said atomizing nozzle against the said liquid fuel jet only at a region outwardly beyond the end of said fuel nozzle to atomize the fuel jet into a fine spray, and a gas fire burner mounted on said support means adjacent said spray generating means and having a burner opening facing in a direction extending across the fuel nozzle orifice and intersecting the said spray of atomized fuel at a point outwardly beyond the said region of atomization of said liquid fuel jet to direct gas fires against and ignite the said fuel spray at the said intersection point.

6. Apparatus for generating a fume of minute light-diffusing particles comprising a burner including support means, spray generating means comprising a fuel nozzle mounted on said support means and having an orifice connected to a liquid fuel source of an organic silicon compound to discharge a liquid jet of the said fuel and a pair of opposed atomizing nozzles mounted on said support means and having orifices connected to a source of a combustion-supporting gas to discharge jets of said gas from the orifices, said atomizing nozzles being located on opposite sides of and spaced from the fuel nozzle and angularly directed across the orifice of said fuel nozzle in a direction away therefrom to intersect the axis thereof at a region beyond the end of said fuel nozzle so as to direct the gas jets from said atomizing nozzles against directly opposite sides of the said liquid fuel jet only at a region outwardly beyond the end of said fuel nozzle to atomize the fuel jet into a fine spray, and a gas fire burner mounted on said support means adjacent said spray generating means and having a burner opening facing in a direction extending across the fuel nozzle orifice and intersecting the said spray of atomized fuel at a point outwardly beyond the said region of atomization of said liquid fuel jet to direct gas fires against and ignite the said fuel spray at the said intersection point.

7. Apparatus for generating a fume of minute light-diffusing particles comprising a burner including support means, spray generating means comprising a fuel nozzle mounted on said support means and having an orifice connected to a liquid fuel source of an organic silicon compound to discharge a liquid jet of the said fuel and a pair of opposed atomizing nozzles mounted on said support means and having orifices connected to a source of a combustion-supporting gas to discharge jets of said gas from the orifices, said atomizing nozzles being located on opposite sides of and spaced from the fuel nozzle and angularly directed across the orifice of said fuel nozzle in a direction away therefrom to intersect the axis thereof at a region beyond the end of said fuel nozzle so as to direct the gas jets from said atomizing nozzles against directly opposite sides of the said liquid fuel jet only at a region outwardly beyond the end of said fuel nozzle to atomize the fuel jet into a fine spray, and a pair of opposed gas fire burners mounted on said support means in the plane of said atomizing nozzles and on opposite sides of said fuel nozzle and having burner openings directed across the fuel nozzle orifice and intersecting the said spray of atomized fuel at a point outwardly beyond the said region of atomization of said liquid fuel jet to direct gas fires against and ignite the said fuel spray at the said intersection point.

References Cited in the file of this patent

UNITED STATES PATENTS

| Number | Name | Date |
|---|---|---|
| 1,794,869 | Schifferle | Mar. 3, 1931 |
| 1,923,866 | Hechenbleikner | Aug. 22, 1933 |
| 1,968,992 | Conkling | Aug. 7, 1934 |

(Other references on following page)

UNITED STATES PATENTS

| Number | Name | Date |
|---|---|---|
| 2,070,696 | Tracy | Feb. 16, 1937 |
| 2,072,375 | McCallum | Mar. 2, 1937 |
| 2,221,770 | Almond | Nov. 19, 1940 |
| 2,249,205 | Hansen | July 15, 1941 |
| 2,272,342 | Hyde | Feb. 10, 1942 |
| 2,348,568 | Pellar | May 9, 1944 |
| 2,399,687 | McNabb | May 7, 1946 |
| 2,406,890 | Mohr | Sept. 3, 1946 |
| 2,428,178 | Reik | Sept. 30, 1947 |
| 2,442,976 | Heany | June 8, 1948 |
| 2,554,829 | Jeurling | May 29, 1951 |
| 2,586,348 | Kuebler | Feb. 19, 1952 |
| 2,593,920 | Reynolds | Apr. 22, 1952 |

FOREIGN PATENTS

| Number | Country | Date |
|---|---|---|
| 31,222 | Australia | Dec. 27, 1907 |